(12) United States Patent
Chen

(10) Patent No.: US 10,382,565 B2
(45) Date of Patent: Aug. 13, 2019

(54) CAPACITY SCALING OF NETWORK RESOURCES

(71) Applicant: Red Hat, Inc., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 30 days.

(21) Appl. No.: 15/417,723

(22) Filed: Jan. 27, 2017

(65) Prior Publication Data

US 2018/0219955 A1    Aug. 2, 2018

(51) Int. Cl.
| | |
|---|---|
| *H04L 29/08* | (2006.01) |
| *G06F 9/50* | (2006.01) |
| *H04L 12/26* | (2006.01) |
| *H04L 12/24* | (2006.01) |
| *H04L 29/12* | (2006.01) |

(52) U.S. Cl.
CPC .......... *H04L 67/148* (2013.01); *G06F 9/5088* (2013.01); *H04L 41/0896* (2013.01); *H04L 43/0805* (2013.01); *H04L 43/087* (2013.01); *H04L 67/1029* (2013.01); *H04L 67/1031* (2013.01); *G06F 2209/503* (2013.01); *H04L 43/16* (2013.01); *H04L 61/1511* (2013.01)

(58) Field of Classification Search
CPC ............... H04L 67/148; H04L 43/0829; H04L 43/0888; H04L 43/16; H04L 61/2007; H04L 67/06; H04L 67/1029; H04L 67/18; H04L 67/42

See application file for complete search history.

(56) References Cited

U.S. PATENT DOCUMENTS

| | | | |
|---|---|---|---|
| 6,463,454 B1 * | 10/2002 | Lumelsky | G06F 9/5083 |
| | | | 707/E17.12 |
| 8,874,749 B1 * | 10/2014 | Vittal | G06F 9/5077 |
| | | | 709/226 |
| 8,949,410 B2 | 2/2015 | Patel et al. | |
| 9,325,662 B2 | 4/2016 | Luna et al. | |
| 9,350,682 B1 * | 5/2016 | Gupta | G06F 9/45558 |
| 9,372,735 B2 | 6/2016 | Calder et al. | |
| 2010/0228819 A1 | 9/2010 | Wei | |

(Continued)

FOREIGN PATENT DOCUMENTS

WO    2010099514 A2    9/2010

OTHER PUBLICATIONS

Google Cloud Platform, "Google Cloud Load Balancing," https://cloud.google.com/loadbalancing/, 13 pages, retrieved Nov. 24, 2016.

(Continued)

*Primary Examiner* — Duc C Ho
(74) *Attorney, Agent, or Firm* — Lowenstein Sandler LLP

(57) ABSTRACT

A mechanism for adjusting a resource availability of a data center is disclosed. A processing device may receive a first request from a client device, wherein the request includes a set of instructions and a host name assigned to an internet protocol (IP) address of a server at a first data center to execute the set of instructions. The processing device may determine that a resource availability of the second data center is less than the resource availability of the first data center. The processing device may send a second response to the client device to send the set of instructions to the IP address of the first data center.

20 Claims, 5 Drawing Sheets

(56) References Cited

U.S. PATENT DOCUMENTS

| | | | |
|---|---|---|---|
| 2014/0101656 A1 | 4/2014 | Zhu et al. | |
| 2015/0067819 A1* | 3/2015 | Shribman | H04L 67/06 |
| | | | 726/12 |
| 2015/0195178 A1* | 7/2015 | Bhattacharya | H04L 45/745 |
| | | | 718/1 |

OTHER PUBLICATIONS

IBM, "Auto Scale," http://www.softlayer.com/autoscale, 4 pages, retrieved Nov. 24, 2016.
Krishnan et al., "Building Your Next Big Thing With Google Cloud Platform," https://books.google.co.in/books?id=BGYnCgAAQBAJ&pg=PA353&lpg=PA353&dq=%22follow+the+sun%22+load+balancing&source=bl&ots=M0pxEU25PT&sig=lgUpYf1Z-hJLQbRL_vlzHWUfbvA&hl=en&sa=X&ved=0ahUKEwjnx86P-LnQAhXJRY8KHe8-CuoQ6AEILjAD#v=onepage&q&f=false, 14 pages, May 22, 2015.

* cited by examiner ately related to
computing systems, and more particularly to capacity scaling of network resources.

CAPACITY SCALING OF NETWORK RESOURCES

TECHNICAL FIELD

Aspects of the present disclosure are generally related to computing systems, and more particularly to capacity scaling of network resources.

BACKGROUND

A network, such as a corporate intranet, a local area network (LAN), or a wide area network (WAN), may be a collection of network resources. Network resources may include database servers, hosts, switches, routers, firewalls, and so forth. Multiple users may access and use the network resources. A network management system may be used to balance an allocation of the network resources across the multiple users.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
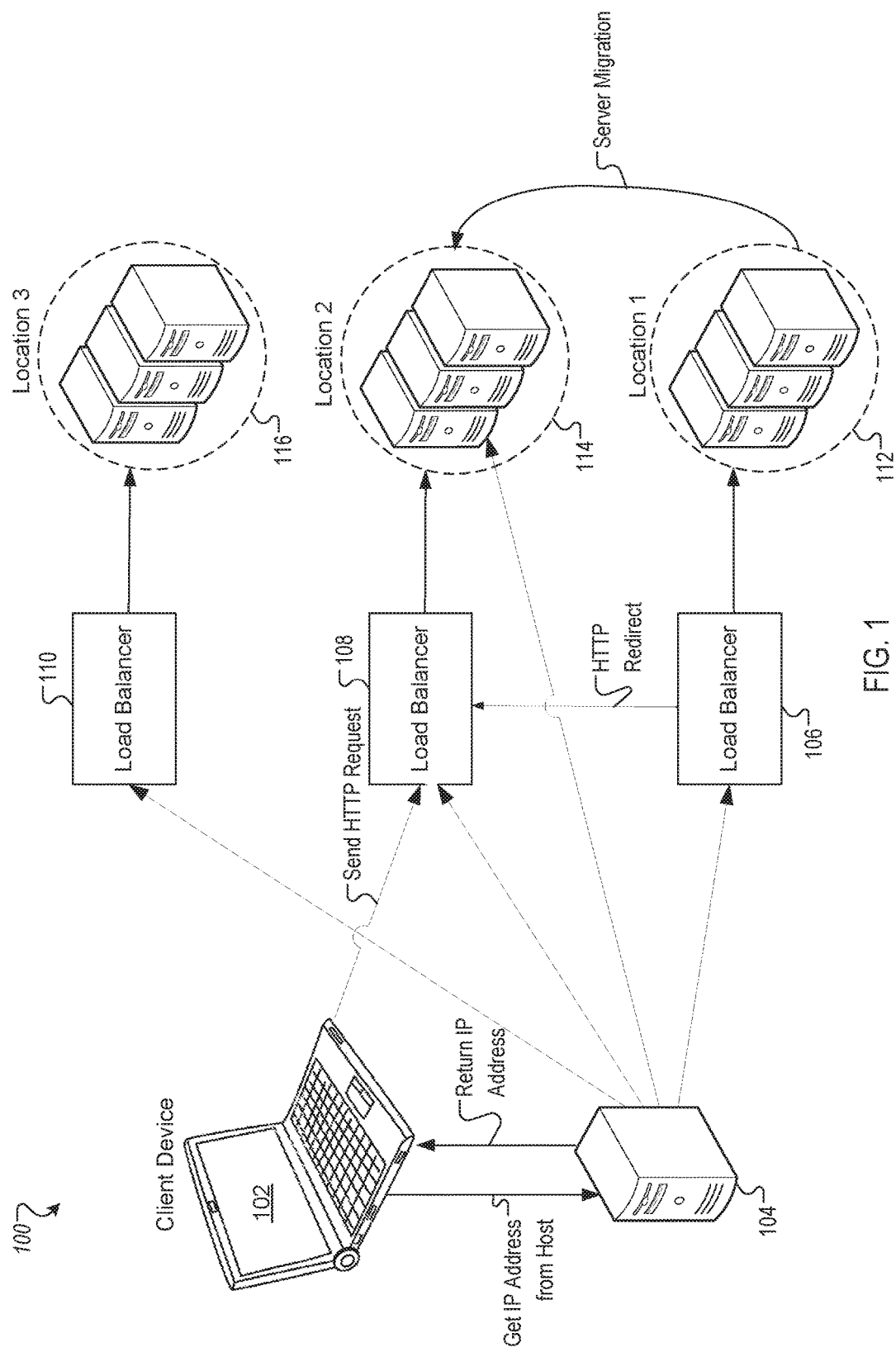
FIG. 1 illustrates a network that includes a client device and data centers according to one example

Cloud applications and virtual machines (VMs) are applications that may run on servers of data centers in a data center system. To balance an availability of resources at the data centers, the cloud applications and VMs may be migrated between servers of geographically dispersed data centers. For example, data storage resources and processing resources of the servers at a data center may be shared across multiple cloud applications and VMs. As the availability of the resources of the servers of a data center decrease, allocation of the resources for a data center may become a performance bottleneck for the cloud applications and VMs due to network latency, resource availability, network bandwidth, a surge in resource demand, and so forth.

To increase performance for the cloud applications and VMs, the cloud applications and VMs may be instantiated at servers of data centers that are geographically in close proximity to a client device requesting instantiation and execution of the cloud applications and VMs. The geographical proximity of the client devices to the data centers may reduce the bottleneck and increase a performance of the cloud applications and VMs by reducing latency and bandwidth issues associated with time lags for data centers located at geographical distances further from the client devices.

However, when the resources at a geographically proximate data center are insufficient to meet the demands of the cloud applications and VMs, a load balancer may migrate one or more of the cloud applications or VMs from the servers at a current data center to the servers at a data center located at a geographical location farther from the client device. Additionally, the load balancer may redirect requests to instantiate new cloud applications and VMs from servers of a closer data center to other data centers farther way with sufficient resources for the cloud applications and VMs.

To balance the workloads of data centers, the load balancer may use a follow-the-sun technique. The load balancer may use the follow-the-sun technique to migrate workloads to data centers at different geographic locations based on different times of the day. The follow-the-sun technique may attempt to minimize the average distance between data centers and the client device to reduce latency and increase the performance of the cloud applications and VMs. However, the follow-the-sun technique uses a global deployment of data centers to have data centers available at the different times of the day.

The global deployment of data centers is expensive to setup and the follow-the-sun technique produces low utilization levels of many data centers and is unable to respond to traffic surges from hot spots.

Aspects of the present disclosure overcome this and other deficiencies by providing a load balancer that adjusts a resource capacity of servers at data centers for varying resource demands. The load balancer may determine a resource availability of servers at a data center and adjust a resource capacity of data servers at a data center in view of resource demands by cloud applications and VMs. Additionally, the load balancer may redirect or migrate cloud applications and VMs to execute on servers at data centers with available resources.

Adjusting the resource capacity of the servers of the data centers may enable client devices to instantiate and run cloud applications and VMs on servers of data centers that are geographically proximate to the client device. One advantage of client devices using servers of data centers that are geographically proximate to the client devices may be to reduce a latency and increase a performance of the cloud applications and VMs that are instantiated and running on geographically proximate servers of the data centers. For example, the client devices using servers of data centers that are geographically proximate to the client devices may increase a data transfer rate (DTR) between the data centers and the client devices.

FIG. 1 illustrates a network 100 that includes a client device 102 and data centers 112-116 according to one example. The data centers 112-116 may include a single server or multiple servers. For example, the data center 112 may include multiple servers operatively coupled together by a communications network. In one implementation, the communications network may use a wide area network (WAN), a local area network (LAN), a virtual private network (VPN), the Internet, and so forth. In another implementation, the communications network may be a transmission control protocol/internet protocol (TCP/IP). The client device 102 may access the servers at the data centers 112-116, load balancers 106-110, and a server 104 via the communications network.

Each of the data centers 112-116 may include a data storage system that includes storage devices, such as an array of physical storage disks. The servers of a data center may host virtual machines. The virtual machines may provide an operating system instance to the client device 102.

In one implementation, the client device 102 may be a program executing on a processing device or a virtual machine. In another implementation, the client device 102 may be a processing device. The client device 102 may send a domain name system (DNS) request to a server 104. The server 104 may be a DNS server or a name-based virtual hypertext transfer protocol (HTTP) server. The domain name system (DNS) is a naming system for computers, services, or other resources connected to a network that associates data or services with host names (also referred to as domain names). The server 104 may translate host names into numerical Internet protocol (IP) addresses for locating and identifying computer services and devices at that IP address. The DNS request may include an instruction and a host name assigned to an IP address of a server at the data center 112 to execute the instruction. The instruction may be a data access instruction or a processing task for the server to perform. For example, the instruction may be a request to read data from a server, write data to a server, perform a computational operation, and so forth.

The server 104 may be operatively coupled to the data centers 112-116. The server 104 may determine that the data center 112 is located at a first location, the data center 114 is located at a second location, and the data center 116 is located at a third location. The first location, the second location, and the third location may be different geographic locations. The server 104 may determine the geographic location of the data centers 112-116 by sending requests for location information to processing devices at the data centers 112-116 and receiving responses indicating the locations of the data centers 112-116. In one implementation, the location of a data center may indicate a geographic location of the data center. In another implementation, the location information of the data center may indicate relative distances between the client device 102 and the data centers 112-116. For example, the location information may indicate that the first location of the first data center 112 is geographically closer to the client device 102 than the second location of the second data center 114 or the third location of the third data center 116.

To determine where to direct the request from the client device 102, the DNS server 104 may determine a resource availability of the first data center 112 and a resource availability of the second data center 114. The resource availability may include a processor utilization level for one or more servers of a data center, an amount of memory available for one or more servers of a data center, an amount of cache available for one or more servers of a data center, a communication bandwidth of a data center, and so forth. In one implementation, to determine the resource availability of the first data center 112, the server 104 may send a latency request to a server at the first data center 112. The server 104 may determine a length of time between sending the latency request and receiving a response to the request. A latency of the latency request may indicate a resource availability of the first data center 112 by indicating an amount of time it may take for the first data center 112 to perform a task and send back a response. To determine the resource availability of the second data center 114, the server 104 may send a request to a server at the second data center 114. The server 104 may determine a length of time between sending the latency request and receiving a response to the latency request. The latency may indicate a resource availability of the second data center 114 by indicating an amount of time it may take for the second data center 112 to perform the task and send back a response.

In another implementation, to determine the resource availability of the first data center 112, the server 104 may send a request to a load balancer 106 coupled to the first data center 112 requesting resource availability information for the first data center 112. In one example, the resource availability information may include information indicating a capacity of the first data center 112 to host or support virtual machines. In another example, the resource availability information may include information indicating an available processing power of the servers of the first data center 112 to perform a computational task. In another example, the resource availability information may include information indicating an amount of memory available to store data. The load balancer 106 may determine the resource availability information for the first data center 112. To determine the resource availability information, the load balancer 106 may determine a number of active resources at the data center 112 and an amount of data accesses or processing tasks that the active resources may handle while maintaining a threshold quality of service (QoS) level.

The load balancer 106 may send a response to the server 104 indicating the resource availability of the first data center 112. To determine the resource availability of the second data center 114, the server 104 may send a request to the load balancer 108 coupled to the second data center 114 requesting resource availability information for the second data center 114. The load balancer 108 may determine the resource availability information for the second data center 114 and send a response to the server 104 indicating a resource availability of the second data center 114.

The server 104 may determine that the resource availability of the first data center 112 is less than a resource availability of the second data center 114. For example, the server 104 may determine that the latency for receiving the response from the first data center 112 is longer than the latency for receiving the response from the second data center 114. The greater latency for the first data center 112 to respond to the request may indicate that the resource availability of the first data center 112 is less than the resource availability of the second data center 114.

When the resource availability of the second data center 114 is less than a resource availability of the first data center 112, the server 104 may send a response to the client device 102 instructing the client device 102 to send the request, such as the data access or processing task, to the IP address of a server at the first data center 112. When the resource availability of the first data center 112 is less than a resource availability of the second data center 114, the server 104 may send a response to the client device 102 instructing the client device 102 to send the instruction to an IP address of a server at the second data center 114. In one implementation, the server 104 may also send a request to the first data center 112 to balance a load of the first data center 112. In another implementation, the load balancer 106 coupled to the first data center 112 may also send a request to the first data center 112 to balance a load of the first data center 112.

In one implementation, to balance the load of the first data center 112, the server 104 may send a request to the first data center 112 or the load balancer 106 to migrate a virtual machine executing on a server at the first data center 112 to a server at the second data center 114. The migration of the virtual machine to the second data center 114 may release resources at the first data center 112 dedicated to the virtual machine. The released resourced may then be reallocated to perform tasks associated with the request from the client device 102.

In one example, to migrate the virtual machine, the first data center 112 may suspend the virtual machine and move configuration files and disk files for the suspended virtual machine to a server at the second data center. The first data center 112 may then migrate the suspended virtual machine to the server at the second data center 114 and activate the virtual machine at the server of the second data center 114. In another example, to migrate the virtual machine, the first data center 112 may move configuration files and disk files for the suspended virtual machine to the server at the second data center 114 without any interruption in the availability of the virtual machine. The first data center 112 may then migrate the virtual machine to the server at the second data center 114, where the virtual machine is live while being migrated.

When the virtual machine has been migrated to the server at the second data center 114, the DNS server 104 may redirect the request, directed to the migrated virtual machine, from an IP address for the server at the first data center 112 to an IP address for the server at the second data center 114. In one example, the request from the client device 102 may be an HTTP request.

In one implementation, to redirect the request, the server 104 may return an IP address associated with a host name of the second data center 114 to the client device 102. The client device 102 may then send the request to the IP address of the server at the second data center 114. In another implementation, the DNS server 104 may set the load balancer 106 to direct a request from the client device to the IP address of a server of the first data center 112 to be redirected to a server of the second data center 114. The server 104 may send an IP address of the server at the first data center 112 to the client device 102. The client device 102 may send the request to the load balancer 106, which may redirect the request to a load balancer 108. The load balancer 108 may then direct the request to a server at the second data center 114.

In another implementation, the server 104 may determine a relative difference in resource availability between the first data center 112 and the second data center 114. When the relative difference is less than a threshold amount, the server 104 may not set the load balancer 106 to redirect the request to the second data center 114. When the relative difference is greater than a threshold amount, the server 104 or the load balancer 108 may redirect the request to the second data center 114. In one implementation, the threshold amount may be an amount associated with a quality of service (QoS) level. In one example, a ten percent difference in resource availability between the first data center 112 and the second data center 114 may be associated with a QoS level defined for the network 100. When the relative difference exceeds ten percent, the server 104 may set the load balancer 106 to redirect the request. When the relative difference is below ten percent, the server 104 may direct the client device 102 to send the request to its original destination. In another implementation, the threshold availability level may be associated with a latency threshold for a QoS level. A latency exceeding the latency threshold may cause the QoS provided to the client device 102 to decrease below a defined threshold. In one implementation, the latency threshold may be 10 milliseconds (msec). In another implementation, the latency threshold may be associated with a packet loss for communications between the client device 102 and the first data center 112. For example, when the latency for a first data center 112 exceeds the latency threshold, the first data center may resend packets to the client device 102 because an acknowledgement message was not sent by the client device 102 to the first data center 112 within a threshold period of time. The server 104 may set the QoS level by selecting a lowest QoS level from among a QoS level of the first data center and a QoS level of the second data center.

The server 104 may set the load balancer 106 to redirect the request to provide the client device 102 with the server at the second data center 114 with a greater resource availability. The greater resource availability of the server at the second data center 114 may provide a higher QoS to the client device 102 than what may be provided by the server at the first data center 112.

In one implementation, when the resource availability of the first data center is below the resource availability of the second data center, the server 104 may send a request to the load balancer 106 to activate one or more inactive servers at the first data center 112. In one example, an inactive server may be a server that is currently not performing any computational tasks or storing any data. In another example, an inactive server may be a server that has been turned off or set to a sleep mode. In another implementation, when the resource availability of the first data center 112 is below a threshold availability level, the server 104 may send a request to the load balancer 106 to activate one or more inactive servers at the first data center 112. In response to activating the one or more inactive servers, the server 104 may send a request to the load balancer 106 to deactivate one or more active servers at the second data center. For example, to conserve energy, the network may be restricted to operating a threshold number of servers. In this example, when one server is activated, another server is deactivated to balance an amount of energy consumed by the network 100.

In another implementation, the server 104 may determine that the request from the client device 102 is a data access request. When the first data center 112 provides stateful services or database services, the server 104 may relocate where the data for the request is stored. For example, when the data access request includes an instruction to access data stored at a server at the second data center 114, the server 104 may request that the server at the second data center 114 transfer the data to a server at the first data center 112.

In another implementation, the server 104 may determine that the request from the client device 102 is a request to write the data to a server at the first data center 112. When the resource availability of the first data center 112 to store data is below a threshold availability level, the server 104 may identify data stored at a server of the first data center 112 that has not been accessed within a threshold period of time and transfer the data to a server at the second data center 114. The data may be transferred to release memory at the first data center 112. The server 104 may then provide the client device 102 with an IP address of a server at the first data center and the client device may write the data to the corresponding server.

As discussed above, the request from the client device 102 may be redirected to the second data center 114 that may provide the client device 102 a higher QoS for the request than the first data center 112. The server 104 may relocate the resources of the first data center 112 so that the first data center 112 has an increased resource availability to handle subsequent requests from the client device 102 or other devices. For example, the server 104 may adjust the resources of the first data center 112, so that to the geographically closest first data center 112 has the resources to respond to the request at the threshold QoS level.

The number of data centers in the network 100 is not intended to be limiting. The network 100 may include multiple data centers. For example, the network 100 may include the third data center 116 and a load balancer 110 coupled to the third data center 116. The server 104 may determine the resource availability level of the first data center 112, the second data center 114, and the third data center 116 and adjust the resources of the first data center 112, the second data center 114, and the third data center 116, as discussed above.

Figure 2:
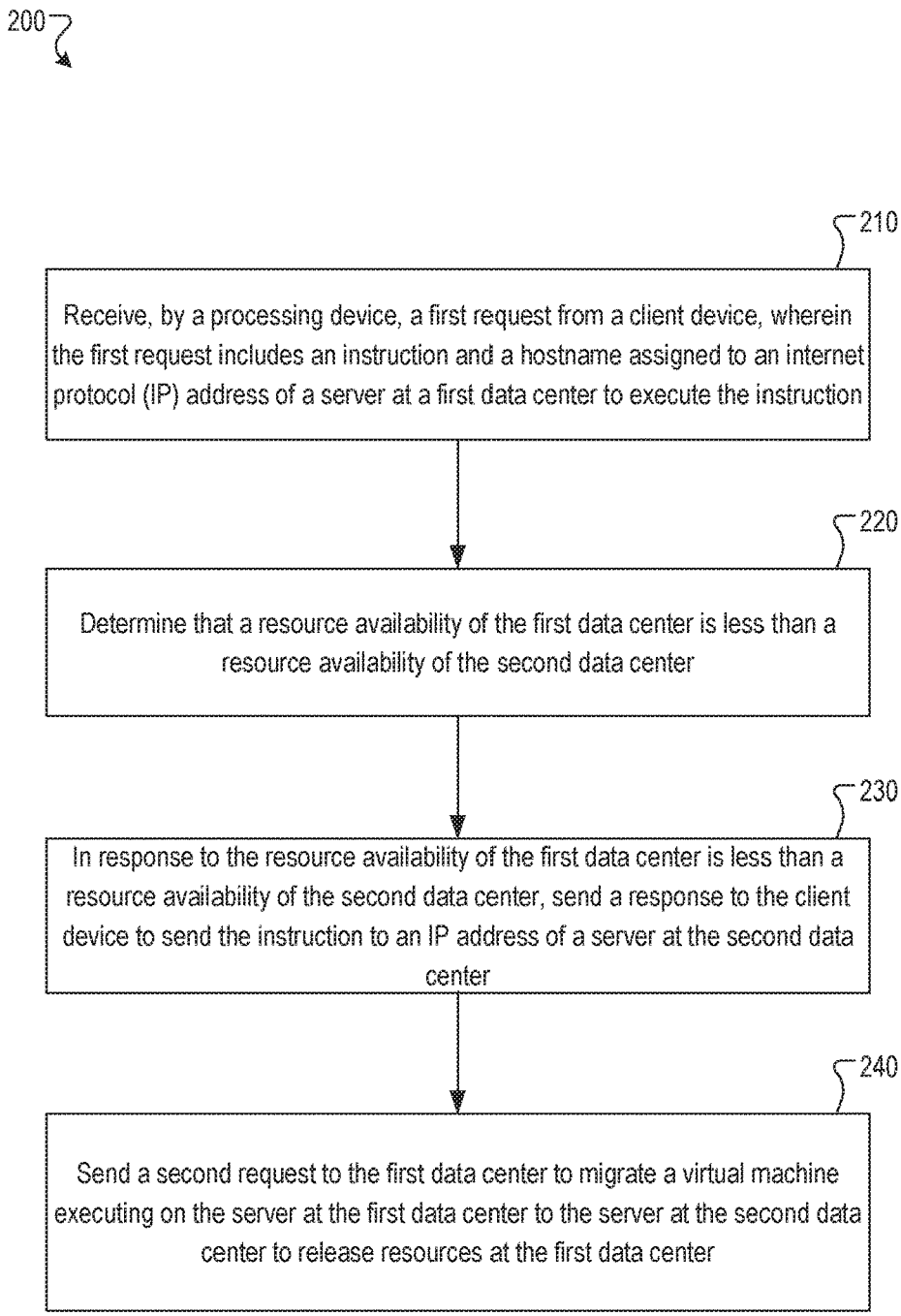
FIG. 2 depicts a flow diagram of one example of a method for balancing a resource availability of a network.

FIG. 2 depicts a flow diagram of one example of a method 200 for balancing a resource availability of a network. The method 200 may be performed by processing logic that may include hardware (circuitry, dedicated logic, etc.), programs (such that is run on a general-purpose computing system or a dedicated machine), or a combination of both. The method 200 may be performed in all or in part by a processing device.

At block 210, a processing device may receive, by a processing device, a first request from a client device, wherein the first request includes an instruction and a host name assigned to an internet protocol (IP) address of a server at a first data center to execute the instruction. At block 220, the processing device may determine that a resource availability of the first data center is less than a resource availability of the second data center. For example, to determine that the resource availability of the first data center is less than the resource availability of the second data center, the processing device may send a first request to the server at the first data center and determine a latency for receiving a first response to the first request. The processing device may also send a second request to the server at the second data center and determine a latency for receiving a second response to the second request. The processing device may then determine that the latency for receiving the first response is longer than the latency for receiving the second response indicating that the resource availability of the first data center is less than the resource availability of the second data center. The processing device may also determine that the first data center is located at a first location and a second data center is located at a second location, wherein the first location is geographically closer to the client device than the second location. For example, to determine that the first data center is located at a first location and the second data center is located at a second location, the processing device may send a request for location information at the first data center and the second data center and receive a response indicating a location of the first data center and the second data center, respectively.

At block 230, the processing device may, in response to determining that the resource availability of the first data center is less than a resource availability of the second data center, send a response to the client device to send the instruction to an IP address of a server at the second data center. In another implementation, the processing device may determine that a difference between the resource availability of the first data center and the resource availability of the second data center exceeds a first threshold level. In response to determining that the difference between the resource availability of the first data center and the resource availability of the second data center exceeds the first threshold level, the processing device may send a response to the client device to send the instruction to an IP address of a server at the second data center. In another implementation, the processing device may determine that the difference between the resource availability of the first data center and the resource availability of the second data center exceeds a second threshold level. In response to determining that the difference between the resource availability of the first data center and the resource availability of the second data center exceeds the second threshold level, the processing device may send a response to the client device to send the instruction to an IP address of a server at the second data center and migrate a virtual machine to the second server.

At block 240, the processing device may send a second request to the first data center to migrate a virtual machine executing on the server at the first data center to the server at the second data center to release resources at the first data center. In another implementation, the processing device may send a response to the client device to send the instruction to an IP address of a server at the second data center. A load balancer coupled to the first data center may resend a request to the first data center to migrate a virtual machine to a server at the third data center.

Figure 3:
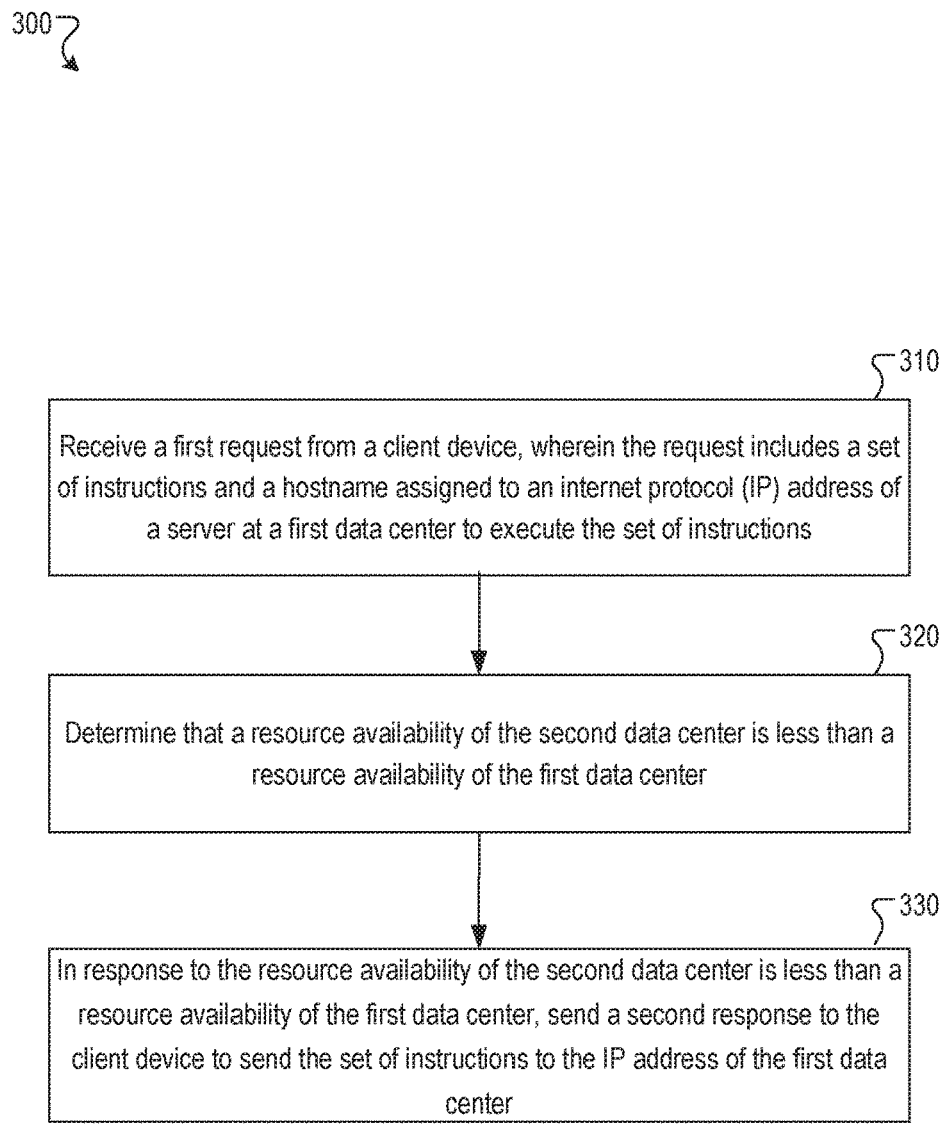
FIG. 3 depicts a flow diagram of one example of another method for balancing resource availability in a network.

FIG. 3 depicts a flow diagram of one example of a method 300 for balancing a resource availability in a network. The method 300 may be performed by processing logic that may include hardware (circuitry, dedicated logic, etc.), programs (such that is run on a general-purpose computing system or a dedicated machine), or a combination of both. The method 300 may be performed in all or in part by a processing device.

At block 310, a processing device may receive a first request from a client device, wherein the request includes a set of instructions and a host name assigned to an internet protocol (IP) address of a server at a first data center to execute the set of instructions. The processing device may be a domain name service (DNS) server or a name-based virtual hypertext transfer protocol (HTTP) server. At block 320, the processing device may determine that a resource availability of the second data center is less than a resource availability of the first data center. The processing device may also determine that the first data center is located at a first location and a second data center is located at a second location, wherein the first location is geographically closer to the client device than the second location. At block 330, the processing device may, in response to determining that the resource availability of the second data center is less than a resource availability of the first data center, send a second response to the client device to send the set of instructions to the IP address of the first data center.

Figure 4:
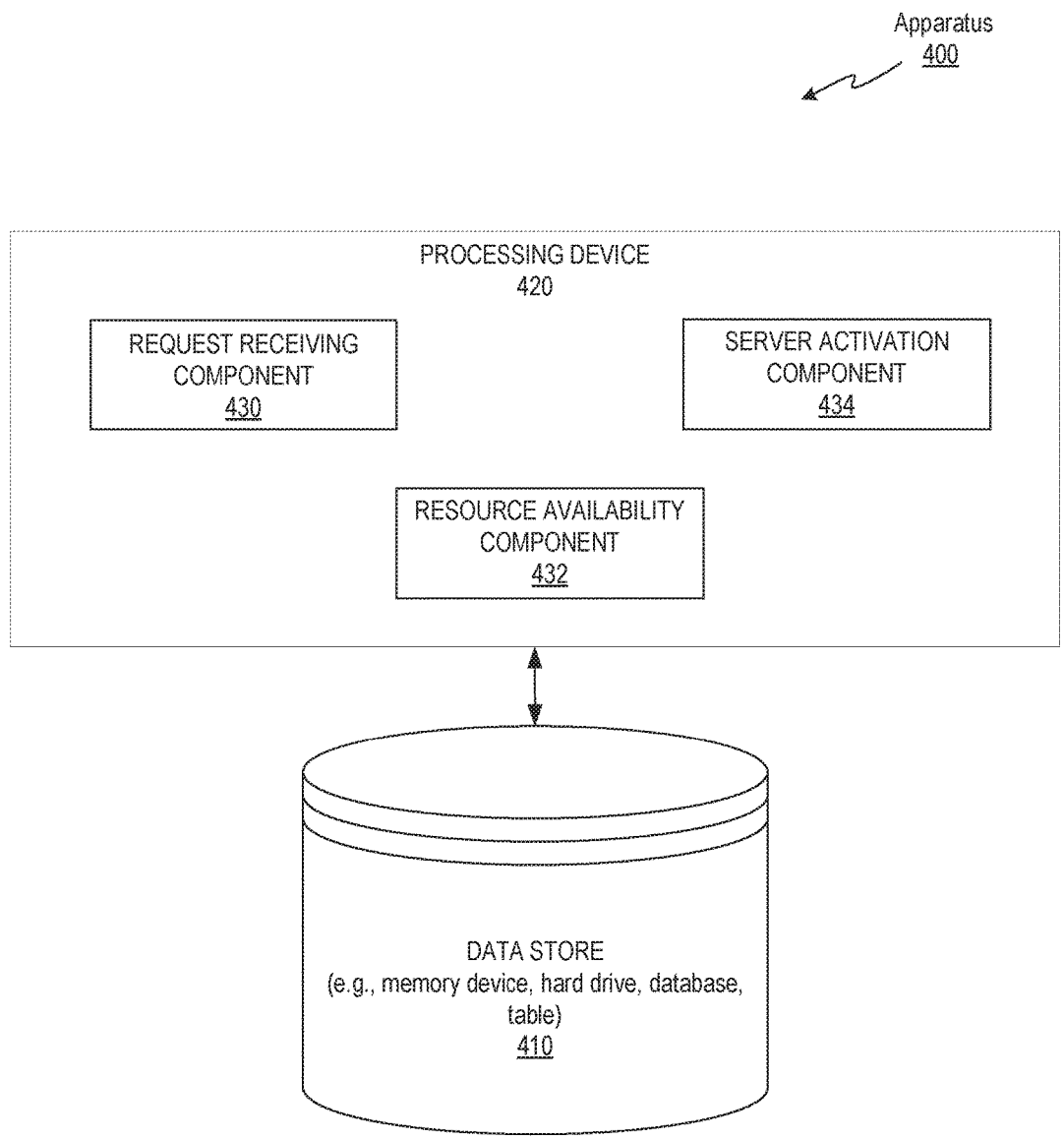
FIG. 4 illustrates an example apparatus in which implementations of the disclosure may operate.

FIG. 4 illustrates an example apparatus 400 in which implementations of the disclosure may operate. The apparatus 400 may be the same or similar to one of the distributed computing system, a network, or other computing devices. The data store 410 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 410 may store information (e.g., policy management information).

The apparatus 400 may include a processing device 420. The processing device 420 may include a request receiving component 430, a resource availability component 432, and a server activation component 434.

The request receiving component 430 may receive a first request from a client device, wherein the request includes a set of instructions and a host name assigned to an IP address of a server at a first data center to execute the set of instructions. The resource availability component 432 may determine that a resource availability of the first data center is less than a resource availability of the second data center. The resource availability component 432 may also, in response to the resource availability of the first data center is less than a resource availability of the second data center, send a response to the client device to send the set of instructions an IP address of the server at the second data center. The server activation component 434 may in response to the resource availability of the first data center being less than the resource availability of the second data center and the resource availability of the first data center being below a threshold availability level, send a second request to a load balancer of the first data center to activate an additional server at the first data center to execute the set of instructions.

Figure 5:
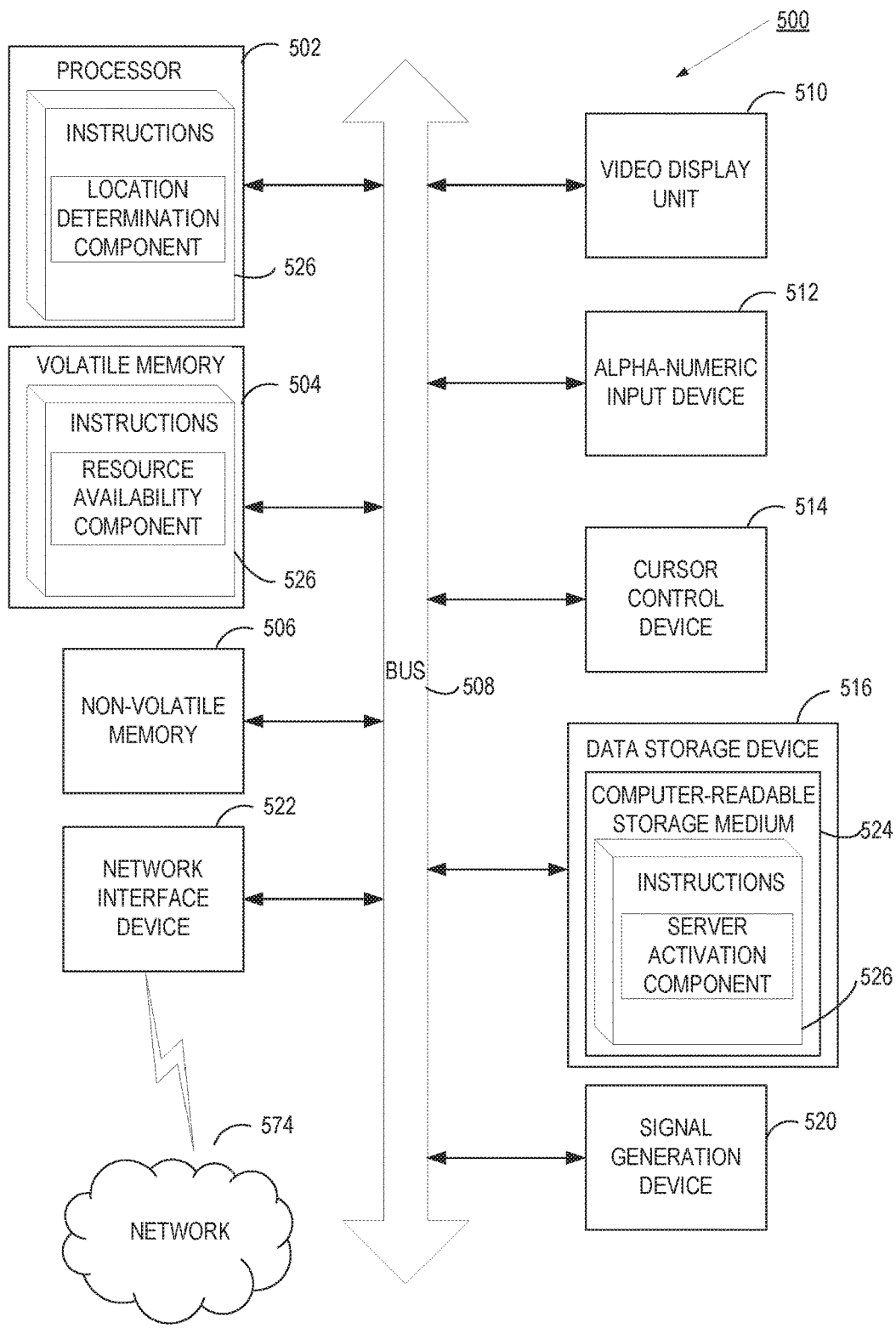
FIG. 5 depicts a block diagram of a computing system operating in accordance with one or more aspects of the present disclosure.

FIG. 5 depicts a block diagram of a computing system operating in accordance with one or more aspects of the present disclosure. In various illustrative examples, computing system 500 may correspond to one or more of the network system, the application, the DNS server, the data centers, the load balancers, the client device, or other computing devices.

In certain implementations, computing system 500 may be connected (e.g., via a network, such as a Local Area Network (LAN), an intranet, an extranet, or the Internet) to other computing systems. Computing system 500 may operate in the capacity of a server or a client computer in a client-server environment, or as a peer computer in a peer-to-peer or distributed network environment. Computing system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computing system 500 may include a processor 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processor 502 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computing system 500 may further include a network interface device 522. Computing system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may be stored instructions 526 encoding any one or more of the methods or functions described herein, including instructions for implementing methods 200 and 300.

Instructions 526 may also reside, completely or partially, within volatile memory 504 and/or within processor 502 during execution thereof by computing system 500, hence, volatile memory 504 and processor 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by program modules or functional circuitry within hardware devices. Further, the methods, components, and features may be implemented in any combination of hardware devices and program components, or only in programs.

Unless specifically stated otherwise, terms such as "loading," "transmitting," "receiving," "overwriting," "initiating," "discovering," "analyzing," or the like, refer to actions and processes performed or implemented by computing systems that manipulate and transform data represented as physical (electronic) quantities within the computing system registers and memories into other data similarly represented as physical quantities within the computing system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computing system selectively programmed by a program stored in the computing system. Such a program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 200 and 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device of a first server, a first request from a client device, wherein the first request includes a task and a host name assigned to an internet protocol (IP) address of a second server at a first data center to perform the task;
   determining that a resource availability of the first data center is less than a resource availability of a second data center;

in response to determining that the resource availability of the first data center is less than the resource availability of the second data center:
sending a response to the client device to send the task to an IP address of a third server at the second data center; and
sending a second request to the first data center to migrate a virtual machine executing on the second server at the first data center to the third server at the second data center to release resources at the first data center.

2. The method of claim 1, wherein determining that the resource availability of the first data center is less than the resource availability of the second data center further comprises:
sending a first latency request to the second server at the first data center;
determining a latency for receiving a first response to the first latency request;
sending a second latency request to the third server at the second data center;
determining a latency for receiving a second response to the second latency request; and
determining that the latency for receiving the first response is longer than the latency for receiving the second response indicating that the resource availability of the first data center is less than the resource availability of the second data center.

3. The method of claim 1, wherein determining that the resource availability of the first data center is less than the resource availability of the second data center further comprises:
sending a second availability request to a second load balancer of the second data center requesting resource availability information for the third server at the second data center;
receiving the resource availability information for the third server at the second data center indicating the resource availability of the second data center; and
determining that the resource availability of the second data center is greater than the resource availability of the first data center.

4. The method of claim 1, further comprising:
sending a first location request for location information to a processing device at the first data center;
receiving a first response indicating a first location of the first data center;
sending a second location request for location information to the processing device at the second data center;
receiving a second response indicating a second location of the second data center; and
determining that the first location is geographically closer to the client device than the second location.

5. The method of claim 1, wherein migrating the virtual machine to the second data center further comprises:
suspending the virtual machine;
relocating configuration files and disk files for the suspended virtual machine to the third server at the second data center;
migrating the suspended virtual machine to the to the server at the second data center; and
activating the virtual machine at the third server at the second data center.

6. The method of claim 1, wherein migrating the virtual machine to the second data center further comprises:
relocating configuration files and disk files for the virtual machine to the third server at the second data center, without any interruption in the availability of the virtual machine; and
migrating the virtual machine to the to the third server at the second data center, wherein the virtual machine is live while being migrated.

7. The method of claim 1, wherein migrating the virtual machine to the third server at the second data center releases the resources dedicated to the virtual machine at the first data center.

8. The method of claim 1, further comprising redirecting the first request from the IP address of the second server at the first data center to the IP address of the third server at the second data center.

9. An apparatus comprising:
a memory to store instructions; and
a processing device, operatively coupled with the memory, to execute the instructions to:
receive a first request from a client device, wherein the first request includes a set of tasks and a host name assigned to an internet protocol (IP) address of a first server at a first data center to perform the set of tasks;
determine that a resource availability of the first data center is less than a resource availability of a second data center;
in response to determining that the resource availability of the first data center is less than the resource availability of the second data center, send a response to the client device to send the set of tasks to an IP address of a second server at the second data center; and
send a second request to a load balancer of the first data center to activate the second server at the second data center to perform the set of tasks.

10. The apparatus of claim 9, wherein to determine that the resource availability of the first data center is less than the resource availability of the second data center, the processing device is further to:
send a first latency request to the first server at the first data center;
determine a latency for receiving a first response to the first latency request;
send a second latency request to the second server at the second data center;
determine a latency for receiving a second response to the second latency request; and
determine that the latency for receiving the first response is longer than the latency for receiving the second response indicating that the resource availability of the first data center is less than the resource availability of the second data center.

11. The apparatus of claim 10, further comprising:
determine a relative difference in the resource availability of the first data center and the resource availability of the second data center;
determine whether the relative difference is greater than a threshold availability level; and
redirect the first request to the second data center when the relative difference is greater than the threshold availability level, wherein the threshold availability level is a latency threshold associated with a quality of service (QoS) level, wherein the latency of the first response indicates an availability of the resources of the first data center.

12. The apparatus of claim 11, wherein the processing device is further to determine the QoS level by selecting a lowest QoS level from among a QoS level of the first data center and a QoS level of the second data center.

13. The apparatus of claim 11, wherein the latency threshold is associated with a packet loss for a communication between the client device and the first data center.

14. The apparatus of claim 9, wherein the processing device is further to, in response to the resource availability of the first data center being less than the resource availability of the second data center and the resource availability of the first data center being below a threshold availability level, send a request to a load balancer of the second data center to deactivate one or more servers at the second data center.

15. The apparatus of claim 9, wherein when the set of tasks includes a task to access data stored at the second server at the second data center, the processing device is further to transfer the data to the second server at the second data center from the first server at the first data center.

16. The apparatus of claim 9, wherein in response to the first server at the first data center storing data in a database, the processing device is further to:
    transfer the data that has not been accessed within a threshold period of time to the second server at the second data center; and
    release memory where the data is stored at the first server of the first data center.

17. A non-transitory computer-readable storage medium, having instructions stored therein, which when executed, cause a processing device to:
    receive a first request from a client device, wherein the first request includes a set of tasks and a host name assigned to an internet protocol (IP) address of a first server at a first data center to perform the set of tasks;
    determine that a resource availability of a second data center is less than the resource availability of the first data center; and
    in response to determining that the resource availability of the second data center is less than a resource availability of the first data center, send a response to the client device to send the set of tasks to the IP address of the first data center.

18. The non-transitory computer-readable storage medium of claim 17, wherein to determine that the resource availability of the first data center is less than the resource availability of the second data center, the processing device is further to:
    send a first latency request to the first server at the first data center;
    determine a latency for receiving a first response to the first latency request;
    send a second latency request to a second server at the second data center;
    determine a latency for receiving a second response to the second latency request; and
    determine that the latency for receiving the first response is longer than the latency for receiving the second response indicating that the resource availability of the first data center is less than the resource availability of the second data center.

19. The non-transitory computer-readable storage medium of claim 17, wherein to determine that the resource availability of the first data center is less than the resource availability of the second data center, the processing device is further to:
    send a first request to a first load balancer of the first data center requesting resource availability information for the first server at the first data center;
    receive the resource availability information for the first server at the first data center indicating a first resource availability of the first data center;
    receive the resource availability information for the second data center indicating a second resource availability of the second data center; and
    determine that the second resource availability is greater than the first resource availability.

20. The non-transitory computer-readable storage medium of claim 17, wherein the processing device is part of a domain name service (DNS) server or a name-based virtual hypertext transfer protocol (HTTP) server.

* * * * *